United States Patent Office 3,410,773
Patented Nov. 12, 1968

3,410,773
ELECTROCOATING WITH UNSATURATED POLYHYDROXYETHER ESTERS
Joseph W. Hagan, Scotch Plains, and William I. Wertz, East Brunswick, N.J., assignors to Union Carbide Corporation, a corporation of New York
No Drawing. Filed June 8, 1965, Ser. No. 462,395
15 Claims. (Cl. 204—181)

This invention relates to electrocoating conductive substrates with unsaturated esters.

It is known to prepare coatings from such unsaturated esters as thermoplastic polyhydroxyethers and from epoxy resins (thermosetting polyhydroxyethers) esterified with fatty acids of drying oils by painting, dipping and spraying various substrates with solutions of these esters dissolved in organic solvents, and drying to a solvent-free, non-tacky adhering coating. These esters form useful primer coats and decorative coats but the use of organic solvents adds to the cost of the process of coating and presents toxicity and fire hazard problems. Furthermore, applying even coats to intricate surfaces having relatively inaccessible areas adds to the difficulties inherent in conventional coating methods.

It has now been discovered that substrates can be coated with a polyhydroxyether ester containing up to about 50% by weight of a fatty acid of a drying oil by a method which comprises electrocoating, at a potential of at least 5 volts D.C., said ester onto an electrically conductive substrate from an aqueous emulsion of said ester. This method involves the steps of:

(a) Electrically contacting the conductive substrate to be coated with an aqueous emulsion of a polyhydroxyether ester of a fatty acid of a drying oil;

(b) Electrically contacting an electrode with said aqueous polyhydroxyether ester emulsion;

(c) Connecting a direct current source in an electrical circuit containing the conductive substrate, electrode and aqueous emulsion; and (d) Applying a voltage of at least 5 volts D.C. for at least 15 seconds.

The term "thermoplastic polyhydroxyether" herein refers to substantially linear polymers having the general formula:

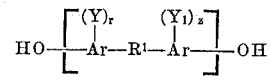

wherein D is the radical residuum of a dihydric phenol, E is an hydroxyl containing radical residuum of an epoxide, and $n$ represents the degree of polymerization and is at least 30 and is preferably 80 or more. The term "thermoplastic polyhydroxyether" is intended to include mixtures of at least two thermoplastic polyhydroxyethers.

The thermoplastic polyhydroxyethers can be prepared by admixing from about 0.985 to about 1.015 moles of an epihalohydrin with one mole of a dihydric phenol together with from about 0.6 to 1.5 moles of an alkali metal hydroxide, such as, sodium hydroxide or potassium hydroxide generally in an aqueous medium at a temperature of about 10° to about 50° C. until at least about 60 mole percent of the epihalohydrin has been consumed. The thermoplastic polyhydroxyethers thus produced have reduced viscosities of at least 0.43, generally from 0.43 to about 1 and preferably from 0.5 to 0.7. Reduced viscosity values were computed by use of the equation:

$$\text{Reduced viscosity} = \frac{t_s \cdot t_0}{ct_0}$$

wherein $t_0$ is the efflux time of the solvent (tetrahydrofuran), $t_s$ is the efflux time of the polyhydroxyether solution, $c$ is the concentration of the polyhydroxyether solution in terms of grams of polyhydroxyether per 100 ml. of tetrahydrofuran.

The dihydric phenol contributing the phenol radical residuum D, can be either a dihydric mononuclear phenol such as those having the general formula:

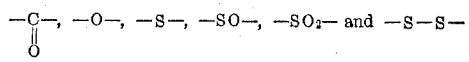

wherein Ar is an aromatic divalent hydrocarbon such as naphthalene and, preferably, phenylene, Y and $Y_1$ which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, $r$ and $z$ integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or a divalent radical including, for example

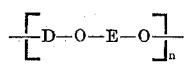

and divalent hydrocarbon radicals such as alkylene, alkylidene, cycloaliphatic, e.g., cycloalkylene and cycloalkylidene, halogenated alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or $R^1$ can be polyalkoxy, or polysiloxy, or two or more alkylidene radicals separated by an aromatic ring, a tertiary amino group, an ether linkage, a carbonyl group or a sulfur containing group such as sulfoxide, and the like.

Examples of specific dihydric polynuclear phenols include among others:

The bis(hydroxyphenyl)alkanes such as 2,2-bis(4-hydroxyphenyl)propane, 2,4' - dihydroxydiphenylmethane, bis(2 - hydroxyphenyl)methane, bis(4 - hydroxyphenyl) methane, bis(4 - hydroxy-2,6-dimethyl-3-methoxyphenyl) methane, 1,1 - bis(4 - hydroxyphenyl)-ethane, 1,2-bis(4-hydroxyphenyl)ethane, 1,1-bis(4 - hydroxy-2-chlorophenyl)ethane, 1,1 - bis(3-methyl - 4 - hydroxyphenyl)ethane, 1,3 - bis(3 - methyl-4-hydroxyphenyl)propane, 2,2-bis(3-phenyl - 4 - hydroxyphenyl)propane, 2,2-bis(3-isopropyl-4-hydroxyphenyl)propane, 2,2-bis(2-isopropyl-4-hydroxyphenyl)propane, 2,2-bis(4-hydroxynaphthyl)propane, 2,2-bis(4-hydroxyphenyl)pentane, 3,3 - bis(4-hydroxyphenyl) pentane, 2,2 - bis(4 - hydroxyphenyl)heptane, bis(4 - hydroxyphenyl)phenylmethane, bis(4 - hydroxyphenyl)cyclohexylmethane, 1,2-bis(4-hydroxyphenyl)-1,2-bis(phenyl)propane, 2,2 - bis(4 - hydroxyphenyl) - 1 - phenyl-propane and the like;

Di(hydroxyphenyl)sulfones such as bis(4-hydroxyphenyl)-sulfone, 2,4' - dihydroxydiphenyl sulfone, 5' - chloro-2,4'-dihydroxydiphenyl sulfone, 5'-chloro-4,4'-dihydroxydiphenyl sulfone and the like;

Di(hydroxyphenyl)ethers such as bis(4-hydroxyphenyl)-ether, the 4,3'-, 4,2'-, 2,2'-, 2,3'- dihydroxydiphenyl ethers, 4,4'-dihydroxy-2,6-dimethyldiphenyl ether, bis(4-hydroxy-3-isobutylphenyl)ether, bis(4-hydroxy-3-isopropylphenyl)ether, bis(4-hydroxy-3-chlorophenyl)ether, bis (4-hydroxy - 3-fluorophenyl)ether, bis(4-hydroxy-3-bromophenyl)ether, bis(4-hydroxynaphthyl)ether, bis(4-hydroxy - 3-chloronaphthyl)ether, bis(2-hydroxydiphenyl) ether, 4,4'-dihydroxy-2,6-dimethoxydiphenyl ether, 4,4'-dihydroxy-2,5-diethoxydiphenyl ether, and the like.

Also suitable are the bisphenol reaction products of 4-vinylcyclohexene and phenyls, e.g., 1,3-bis(p-hydroxyphenyl)-1-ethylcyclohexane, and the bisphenol reaction products of dipentene or its isomers and phenols such as 1,2-bis(p-hydroxyphenyl) - 1-methyl - 4-isopropylcyclohexane as well as bisphenols such as 1,3,3-trimethyl-1-

(4-hydroxyphenyl) - 6-hydroxyindane, and 2,4-bis(4-hydroxyphenyl)-4-methylpentane, and the like.

Particularly desirable dihydric polynuclear phenols have the formula

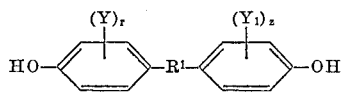

wherein Y and $Y_1$ are as previously defined, r and z have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein, mixtures of these compounds are intended to be included.

The epoxide contributing the hydroxyl containing radical residuum, E, can be a monoepoxide or diepoxide. By "epoxide" is meant a compound containing an oxirane group, i.e., oxygen bonded to two vicinal aliphatic carbon atoms, thus

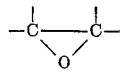

A monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e., $>C=C<$ and acetylenic unsaturation, i.e., $-C\equiv C-$, are preferred. Particularly preferred are halogen substituted saturated monoepoxides, i.e., the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen —O—, ether oxygen —O—, oxacarbonyl oxygen

carbonyl oxygen

and the like.

Specific examples of monoepoxides include epichlorohydrins such as epichlorohydrin, epibromohydrin, 1,2-epoxy - 1-methyl-3-chloropropane, 1,2-epoxy-1-butyl-3-chloropropane, 1,2-epoxy - 2-methyl - 3-fluoropropane, and the like.

Illustrative diepoxides include diethylene glycol bis (3,4-epoxycyclohexane-carboxylate), bis-3,4-epoxycyclohexylmethyl) adipate, bis(3,4 - epoxycyclohexylmethyl) phthalate, 6-methyl - 3,4-epoxycyclohexylmethyl-6-methyl-3,4-epoxycyclohexane carboxylate, 2-chloro-3,4-epoxycyclohexylmethyl - 2-chloro - 3,4-epoxycyclohexane carboxylate, diglycidyl ether, bis(2,3-epoxycyclopentyl) ether, 1,5-pentanediol bis(6-methyl - 3,4-epoxycyclohexylmethyl)ether, bis(2,3-epoxy - 2-ethylhexyl)adipate, diglycidyl maleate, diglycidyl phthalate, 3-oxatetracyclo [4.4.0.1$^{7,10}$.0$^{2,4}$]undec-8-yl 2,3-epoxypropyl ether, bis (2, 3-epoxycyclopentyl)sulfone, bis(3,4-epoxyhexoxypropyl) sulfone, 2,2'-sulfonyldiethyl bis (2,3-epoxycyclopentanecarboxylate), 3-oxatetracyclo[4.4.0.1$^{7,10}$.0$^{2,4}$]-undec-8-yl 2,3-epoxybutyrate, 4-pentenal-di-(6-methyl - 3,4-epoxycyclohexylmethyl)acetal, ethylene glycol bis(9,10-epoxy-stearate), diglycidyl carbonate, bis(2,3-epoxybutylphenyl)-2-ethylhexyl phosphate, diepoxydioxane, butadienedioxide, and 2,3-dimethyl butadiene dioxide. The preferred diepoxides are those wherein each of the oxirane groups is connected to an electron donating substituent which is not immediately connected to the carbon atoms of that oxirane group. Such diepoxides having the grouping

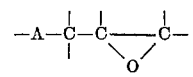

wherein A is an electron donating substituent such as —O—,

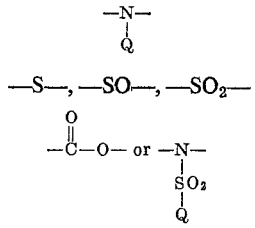

and Q is a saturated hydrocarbon radical such as an alkyl, cycloalkyl, aryl or aralkyl radical.

A single monoepoxide or diepoxide or a mixture of at least two monoepoxides or diepoxides can be employed in preparing thermoplastic polyhydroxyethers and the terms "monoepoxide" and "diepoxide" are intended to include a mixture of at least two monoepoxides or diepoxides, respectively.

Melt flow of each of the thermoplastic polyhydroxyethers was determined by weighing in grams the amount of polyhydroxyether which, at a temperature of 220° C. and under a pressure of 44 p.s.i., flowed through an orifice having a diameter of 0.0825" and a length of 0.315" over a ten-minute period. Four such determinations were made and the average of the four determinations is reported as decigrams per minute under a pressure of 44 p.s.i. and at 220° C.

The thermoplastic polyhydroxyethers of the present invention are substantially free of 1,2-epoxy groups as evinced by the application of the two "epoxide equivalent" analytical tests described in "Epoxy Resins" by H. Lee and K. Neville, pages 21–25, McGraw-Hill Book Co., Inc., New York (1957). In the first test, which involves the reaction of 1,2-epoxy groups with a known amount of hydrochloric acid followed by back-titration of the remaining acid to determine the acid consumed, no hydrochloric acid was consumed. In the second test, in which the infrared absorbance at 10.95 and 11.60μ (wave lengths at which 1,2-epoxy groups absorb light) was measured, no absorbance was evinced by the thermoplastic polyhydroxyethers.

Thus, it may be concluded that within the experimental limits of these standard tests, no 1,2-epoxy groups are present in these thermoplastic polyhydroxyethers.

Curing agents, for example, amines, such as imidazole and N,N-dimethylbenzylamine have no curing or hardening effect on thermoplastic polyhydroxyethers in sharp contrast with their effect on liquid or solid epoxy resins which are hardened into thermoset resins with such curing agents.

The preparation and properties of the thermosetting polyhydroxyethers or epoxy resins suitable for use in the present invention are adequately described in the such texts as "Epoxy Resins," by H. Lee and K. Neville, McGraw-Hill Book Co. Inc. New York (1957).

The unsaturated esters of this invention can be prepared from the polyhydroxyethers (both thermoplastic and thermosetting), described previously, by esterification methods well known in the art.

The unsaturated ester emulsions can be prepared by techniques well known in the art with water and an emulsifying agent such as ammonium oleate, morpholine oleate, dioctyl sodium sulfosuccinate, or the like, and thinned to a solids content of preferably about 5 to 20% solids content. If desired, emulsions ranging from about 1 to 60% solids content can be used.

Although it is preferred to use anionic emulsifying agents, cationic emulsifying agents can also be used in which case electrocoating takes place at the cathode rather than at the anode.

The term "fatty acid of drying oil" is used herein to describe the acid constituents of those liquid substances that are converted by the action of oxygen in the air to dry, hard, resinous substances and which consist principally of triglycerides having a relatively high degree of unsaturation. Typical drying oil acids are those derived from tall oil, linseed oil, soybean oil, tung oil, castor oil, oiticica oil, perilla oil, safflower oil, menhaden oil and the like. Fatty acids found in these oils comprise chiefly oleic, linoleic and linolenic acids as well as palmitoleic, rincinoleic, licanic, rosin and eleostearic acids. These oils are well known articles of commerce.

The lower limit of the applied voltage used in the electrodeposition process is about 5 volts D.C. The upper limit is not narrowly critical being determined by such considerations as the breakdown voltage of the electrodeposited film, the heat generated, the heat transfer rate of the system used and the cost of the electrical power. Voltages of up to 500 volts D.C., the upper limit of the power source used have given satisfactory results.

The electrocoating temperature is not narrowly critical other than boiling point and freezing point of the emulsions used. For practical applications it is preferred to use temperatures in the range of about 15 to 60° C.

The electrocoating time is not critical since coating of the substrate begins in a fraction of a second from the point where the electrical circuit is closed and stops when a continous insulating coating is deposited. It is preferred to use at least 30 seconds for the electrocoating process.

Atmospheric pressure is preferred although superatmospheric and subatmospheric pressures can be used if desired.

Any available source of direct current can be used such as a motor-generator unit, batteries, rectified alternating current, and the like.

The substrates to be coated can be metallic or non-metallic as long as the surface is electroconductive. Suitable metal substrates include aluminum, copper, steel, nickel, chrominum, tin, zinc and the like as well as their alloys and surface treated variations of the above obtained by etching, sand blasting, phosphatizing, pickling and the like. Non-metallic conductive substrates include carbon, graphite and the like. In addition, metal coated non-conductors such as thin metal coated articles obtained by sputtering, sintering, evaporating, dip coating and other methods known in the art can also be used as substrates.

The electrode used in conjunction with the conductive substrate is not critical but it preferably should be inert under the conditions of the electrocoating process. Materials which are suitable include carbon, graphite, lead, stainless steel, tin, platinum, rhodium and the like.

The conductive substrate to be coated can be either the anode or the cathode in this electrocoating process. When the substrate is the anode an anionic emulsifying agent is used to prepare the polyhydroxyether ester emulsion. Conversely, when the substrate is the cathode a cationic emulsifying agent is used.

No special equipment is needed to confine the ester aqueous emulsion during the electrocoating process. The container can be a non-conductor such as glass, plastic, wood and the like or it can be a conductor such as lead, carbon, graphite or the like and then be used as the electrode as well.

The electrocoated substrates can be dried at ambient temperatures or baked at temperatures up to about 300° C.

Pigments such as carbon black, titanium dioxide, calcium carbonate, talc and the like can be added to the aqueous emulsion if a pigmented coating is desired.

Electrocoating offers many advantages over the more conventional methods of applying coatings to a substrate. These are:

(1) Uniform film thickness on all parts of the article being coated. This means that all surfaces, including edges, corners, shielded and box sections are coated uniformly. Articles that are almost impossible to coat satisfactorily on a production line by any other method, can be coated by this process. The reason for this is that, as the coating deposits, an insulating effect is observed and the current then shifts to areas of least resistance. The process continues until all areas have been coated including edges, corners and any pinholes that may have appeared.

The ability of any given composition to coat these inaccessible areas is termed its "throwing power." The throwing power varies, depending upon the type of resin being used and also upon the conditions under which it is being deposited.

One method of measuring throwing power is to immerse a steel pipe of approximately ¾ inch I.D. in a bath to a depth of about 10 inches. This pipe is then used as the anode. The ability of the ester to coat the inside surface of the pipe is a measure of its throwing power. For example, if the pipe is immersed to a depth of 10 inches and only 5 inches of the inner surface are coated, the resin is said to have 50% throwing power; if 7 inches are coated, it has 70% throwing power. The more insulating the film, the better the throwing power and vice versa; the more conductive the film, the poorer the throwing power.

(2) Runs and sags are eliminated. When the article is withdrawn from the bath it is coated primarily with ester that has been electrodeposited but at the same time it has a very thin film of low solids ester emulsion from the normal dipping operation. Most of this low solids emulsion will drain back into the container. The remaining excess can then be washed off, leaving behind only the smooth, uniform film that was applied by electrocoating. This electrodeposited film, being virtually dry, leaves the article free of any runs, sags or fat edges.

(3) Solvent washing is eliminated. One of the major problems in the conventional coating of confined box sections has been the washing off of the coating from the enclosed section due to solvent refluxing during baking. Solvent washing is not a problem in electrocoating. The ester coating film is virtually dry as it comes from the bath and is not subjected to the refluxing action of the solvent.

(4) No flash-off time is required. The article can be baked or air dried immediately without any flash-off period because the volatile components are removed during the coating process.

(5) All seams and recessed areas are fully protected by the penetration of ester resin. This is particularly important in areas between spot-welded surfaces.

(6) Electrocoating provides better corrosion protection due to its better overall coverage and its more uniform film thickness.

(7) More efficient utilization of ester. Most of the excess emulsion drains back into the container. The amount washed off during the water rinse step is negligible. Utilization as high as 95% has been calculated.

(8) The use of water-thinned esters offers the advantages of reduced fire hazard, low cost thinner, and reduced odor and toxicity commonly associated with organic solvents.

(9) The process is suited to fully conveyorized plants.

The invention is further illustrated by the examples which follow in which all parts and percentages are by weight unless otherwise specified.

EXAMPLE 1

*Preparation of thermoplastic polyhydroxyether*

A 2-liter round bottom flask was equipped with a sealed mechanical stirrer, thermometer, and reflux condenser. There was placed therein:

| | Parts |
|---|---|
| 2,2-bis(4-hydroxyphenyl)propane (0.5 mole) | 114.5 |
| Epichlorohydrin (99.1% pure) (0.5 mole) | 46.8 |
| Ethanol | 96.0 |
| Butanol | 10.0 |
| Sodium hydroxide (97.5% pure) | 22.6 |
| Water | 70.0 |

The above mixture was stirred at room temperature for 16 hours to accomplish the initial coupling reaction. The mixture was then heated at 80° C. for an hour. Sixty milliliters of a 7:3 mixture of toluene:butanol was added. Heating of the mixture at 80° C. was continued another two hours. There was added an additional 50 parts of the 7:3 toluene:butanol mixture and 4.5 parts of phenol. The contents of the vessel were continued heated at 80° C. (reflux) for 2½ hours. Upon cooling, the reaction mixture was cut with 200 parts of the 7:3 toluene:butanol mixture. One hundred parts of water was added and agitated with the contents to dissolve salts present in the reaction mixture. The vessel contents were allowed to settle for ten minutes during which time a lower brine phase formed. This lower phase was separated by decantation. The upper polymer solution containing phase was washed successively with two 160-part portions of water containing 4.5% butanol. The washed polymer solution was acidified by stirring the solution with a mixture of 1 part of 85% phosphoric acid with 100 parts of water (pH=2) for one hour. The upper polymer solution phase was again separated by decantation and water washed with four successive 200-part portions of water containing 4.5% butanol. The washed polymer was then coagulated in 1,000 parts of isopropanol, filtered and dried. There was obtained a thermoplastic polyhydroxyether of 2,2 - bis(4 - hydroxyphenol)propane and epichlorohydrin having a melt flow of 7.0 decigrams per minute.

Thermoplastic polyhydroxyethers having melt flows between 0.5 and 20 and more particularly 1 to 10 are preferred.

EXAMPLE 2

*Preparation of polyhydroxyether fatty acid ester*

One hundred parts of thermoplastic polyhydroxyether prepared as in Example 1 was charged with 66.7 parts of soya fatty acids and 6.5 parts of xylene to a 1-liter round bottom flask equipped with a mechanical agitator, condenser, water trap and inert gas inlet tube. The flask was flushed with nitrogen and heated gradually over a period of 90 minutes to a temperature of 500° F. The viscous reaction mass was held at this temperature for about 5 hours using a xylene azeotropic reflux to remove water of reaction. The product polyhydroxyether soya fatty acid ester which had an acid number of less than 8 was then diluted with 238.0 parts xylene to a 40% solids content. This product had a specific gravity of 0.933 g./cc., a Gardner color of 4-5 and a Gardner-Holdt viscosity of Z.

EXAMPLE 3

*Preparation of polyhydroxyether fatty acid ester emulsion*

A charge consisting of 200 parts of the ester product of Example 2, 14.3 parts of oleic acid, and 7.0 parts of morpholine was heated to 90° C. with stirring in a 1 liter round bottom flask equipped with a condenser, thermometer, addition funnel and a three bladed propellor agitator driven by a high speed motor. After stirring for 5 minutes at 90° C. the agitation was increased and 100 parts of water was added to the reactants in small equal increments over a 40 minute period at a temperature of 85–90° C. Another 100 parts of water was added in small equal increments over a period of 20 minutes. Agitation was continued for an additional 10 minutes but with the heating discontinued. After cooling the polyhydroxyether fatty soya acid ester aqueous emulsion was discharged from the reaction flask.

EXAMPLE 4

*Preparation of epoxy resin ester*

A 500 ml. round bottom flask equipped with a mechanical agitator, condenser, water trap and gas inlet tube was charged with 63.14 parts of a liquid epoxy resin (derived from 2,2-bis(4-hydroxyphenyl)propane and having an epoxide equivalent of 185–200), 36.86 parts of 2,2-bis(4-hydroxyphenyl)propane, 1.60 parts of refined tall oil acids (containing 1% rosin), 0.145 part of lithium naphthenate (1.4% lithium metal), and 4.06 parts of xylene. The flask was purged with nitrogen and the flask contents heated rapidly, with agitation under a blanket of nitrogen, to 390° F. An exothermic reaction occurred at 390° F. as evinced by a temperature rise of about 100° F. in 5 to 10 minutes. The reactants were cooled to about 470° F. and this temperature maintained for about 30 minutes. Then 90 parts of refined tall oil acids (containing 1% rosin) and 0.38 part of triphenyl phosphite were added to the reactants in the flask and the flask heated rapidly to 500° F. While the xylene refluxed vigorously the temperature of 500° F. was maintained for 1 hour. Cooling to 450° F. was then effected by adding sufficient xylene to maintain a vigorous reflux at 450° F. The temperature was held at 450° F. until the reactants had an acid number of 12–14. The temperature was lowered to 350° F. and the epoxy resin ester product discharged from the flask after stripping off xylene to a point where the solids content was 97–98%.

EXAMPLE 5

*Preparation of epoxy resin ester emulsion*

The epoxy resin ester prepared in Example 4 was heated to 210° F. and 200 parts charged to a 1-liter round bottom flask equipped with a condenser, thermometer, addition funnel and three bladed propellor agitator, attached to a high speed motor. Then 6 parts of morpholine was added with stirring and the agitation continued for 10 minutes at 210° F. Under rapid agitation 206 parts of water was added from the dropping funnel according to the following schedule:

7% in 60 minutes
7% in 20 minutes
7% in 15 minutes
7% in 10 minutes
7% in 10 minutes
65% in 30 minutes During the addition of the first 35% of water the temperature of the flask contents was not allowed to fall below about 190° F. During the addition of the last 65% of the water the heating was discontinued. The aqueous emulsion of epoxy resin ester was then discharged from the flask having a solids content of about 50%.

EXAMPLES 6–10

*Electrocoating with epoxy resin fatty acid ester*

The emulsion prepared as in Example 5 with ammonium oleate emulsifying agent was diluted with water to 7.5% solids and 500 ml. of the resultant emulsion placed in a 1-liter beaker. Two 2" x 6" Bonderite 100 steel panels (phosphatized steel panels) were clamped above the beaker in a parallel relation joined at both edges with tape with a space of about ⅛ inch between them at a height such that areas 2" x 3" were immersed in the emulsion. They were electrically connected with copper wires to the positive output terminal of a variable voltage rectifier, Model 500 BA power supply. The rectifier had a voltage range of 0–500 volts D.C. and was capable of producing 10 amperes continuously at 35° C. or 15 amperes intermittently. A single Bonderite panel 2″ x 6″ electrode was clamped above the beaker with an area 2 x 3 inches immersed in the aqueous emulsion. This electrode was electrically connected to the negative output terminal of the power supply. Several runs were made with replicate pairs of panels at 10, 20, 40, 60 and 150 volts D.C. for 2 minutes at ambient temperatures and atmospheric pressure. The coated panels were all cured in a forced draft electrical oven for 45 minutes at about 275° F. Excellent clear, smooth and tough coatings were obtained in each run.

EXAMPLES 11–13

*Electrocoating with thermoplastic polyhydroxyether fatty acid ester*

Example 6–10 were repeated at 40, 60 and 150 volts D.C. with the exception that the thermoplastic polyhydroxyether fatty acid ester emulsion prepared in Example 3 was substituted for the epoxy resin fatty acid ester emulsion. Tough, glassy coats were obtained on the Bonderite 100 panels.

EXAMPLES 14–15

*Electrocoating with pigmented epoxy resin fatty acid ester*

The epoxy resin emulsion prepared as in Example 5 and diluted to about 15% solids content (104 parts) was mixed with 53.5 parts of pigment grade red iron oxide and 0.19 part of manganese naphthenate while maintaining the emulsion. The emulsion was then diluted to 10% solids content with water. Using the technique described in Examples 6–10 with pairs of Bonderite 100 steel panels taped together at the edges and separated by a glass rod ⅛ inch in diameter; voltages of 100 and 150 volts D.C. were applied in two separate experiments for 60 seconds each. The distance between the anodic panels and the cathodic electrode was 2 inches. By measuring the areas of coating on the inner and outer panel surfaces it was found that hard, tough coats 0.9 to 1.8 mils thick were electrodeposited with a throwing power of about 90%.

EXAMPLES 16–32

*Electrocoating of various substrates*

Using the procedures and materials described in Examples 2–15 with copper, zinc, tin, aluminum, carbon and copper dip coated on polystyrene, phenolic, epoxy and thermoplastic polyhydroxyether resins essentially similar electrocoats are obtained.

Although the invention has been described in its preferred forms with a certain amount of particularity, it is understood that the present disclosure has been made only by way of example, and that numerous changes can be made without departing from the spirit and scope of the invention.

What is claimed is:
1. Method of coating a substrate with a polyhydroxyether ester containing up to 50% by weight of a fatty acid of a drying oil, which comprises electrocoating, at a potential of at least 5 volts D.C., said ester onto a conductive substrate from an aqueous emulsion of said ester.

2. Method claimed in claim 1 wherein the ester is derived from a thermoplastic polyhydroxyether, substantially free of 1,2-epoxy groups, and having the general formula:

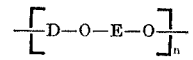

wherein D is the radical residuum of a dihydric phenol, E is a hydroxyl containing radical residuum of an epoxide, and $n$ represents the degree of polymerization and is at least 30.

3. Method claimed in claim 2 wherein D is the radical residuum of 2,2-bis(4-hydroxyphenyl)propane, E is the radical residuum of epichlorohydrin and $n$ is at least 80.

4. Method claimed in claim 2 wherein the drying oil is soybean oil.

5. Method claimed in claim 1 wherein the ester is derived from an epoxy resin.

6. Method claimed in claim 5 wherein the epoxy resin is derived from 4,4-bis(4-hydroxyphenyl)propane and epichlorohydrin.

7. Method claimed in claim 5 wherein the drying oil is tall oil.

8. Method of coating a conductive substrate with a polyhydroxyether ester, containing up to 50% by weight of a fatty acid of a drying oil which comprises the steps of:
 (a) electrically contacting the conductive substrate with an aqueous emulsion of a polyhydroxyether ester of a fatty acid of a drying oil;
 (b) electrically contacting an electrode with said aqueous polyhydroxyether ester emulsion;
 (c) connecting a direct current source in an electrical circuit containing the conductive substrate, electrode and aqueous emulsion; and
 (d) applying a voltage of at least 5 volts D.C. for at least 15 seconds.

9. Method claimed in claim 8 wherein the conductive substrate is connected as an anode to the positive terminal of the D.C. source.

10. Method claimed in claim 8 wherein the conductive substrate is connected as a cathode to the negative terminal of the D.C. source.

11. Method claimed in claim 8 wherein the coated conductive substrate is removed from the electrical circuit and dried.

12. Method claimed in claim 11 wherein the drying temperature is about 70 to 300° F.

13. Method claimed in claim 8 wherein the conductive substrate is a metal.

14. Method claimed in claim 8 wherein the conductive substrate is a non-metal.

15. Method claimed in claim 8 wherein the conductive substrate comprises a non-conductor with a conductive surface.

References Cited

UNITED STATES PATENTS 3,340,172   9/1967   Huggard _____ 204—181

HOWARD S. WILLIAMS, *Primary Examiner.*